(No Model.) 2 Sheets—Sheet 1.
H. WUNDER.
MACHINE FOR WASHING ORES.
No. 414,103. Patented Oct. 29, 1889.
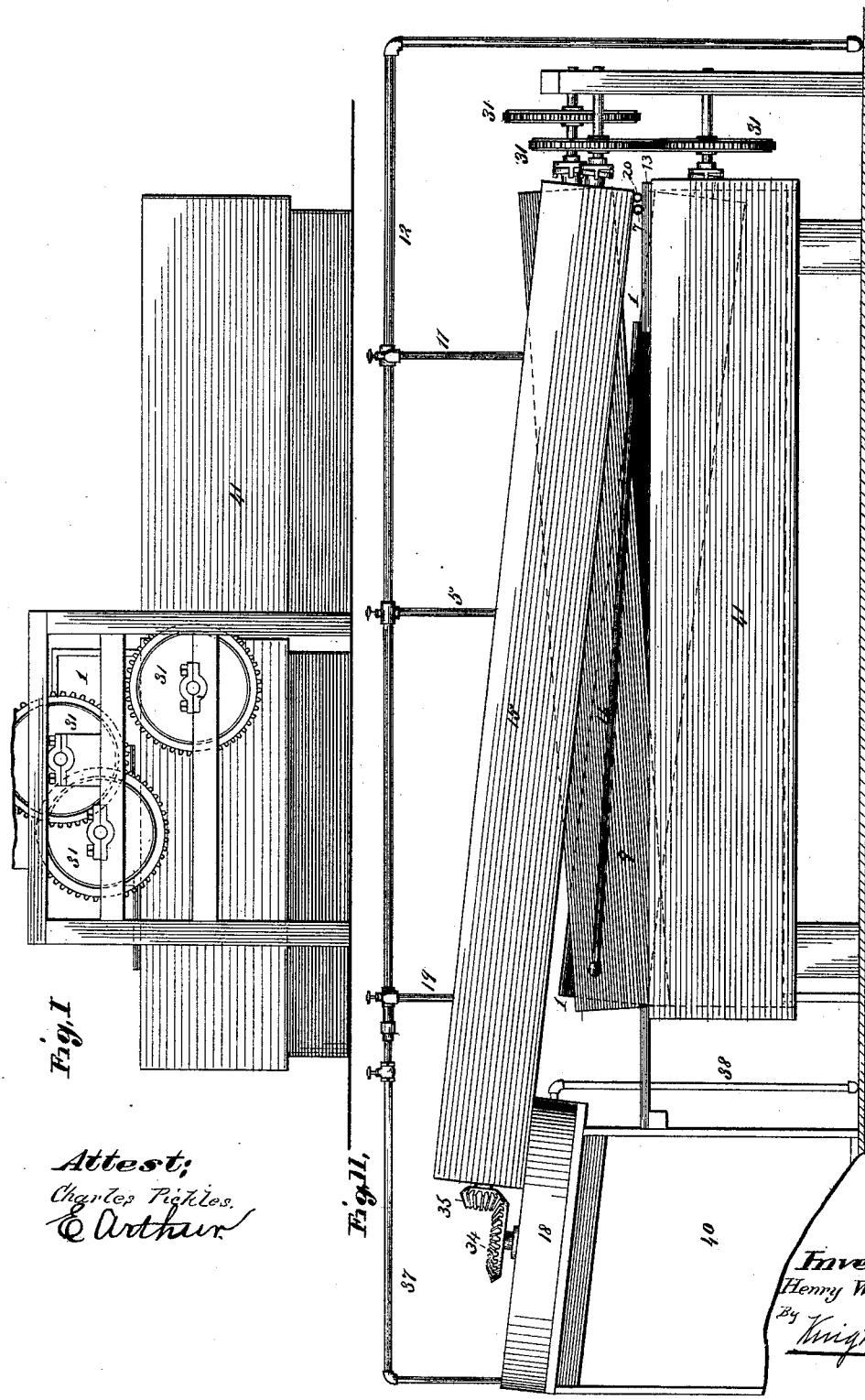
Attest:
Charles Pickles.
E. Arthur
Inventor:
Henry Wunder
By Knight Bro
Atty's (No Model.) 2 Sheets—Sheet 2.
H. WUNDER.
MACHINE FOR WASHING ORES.
No. 414,103. Patented Oct. 29, 1889.
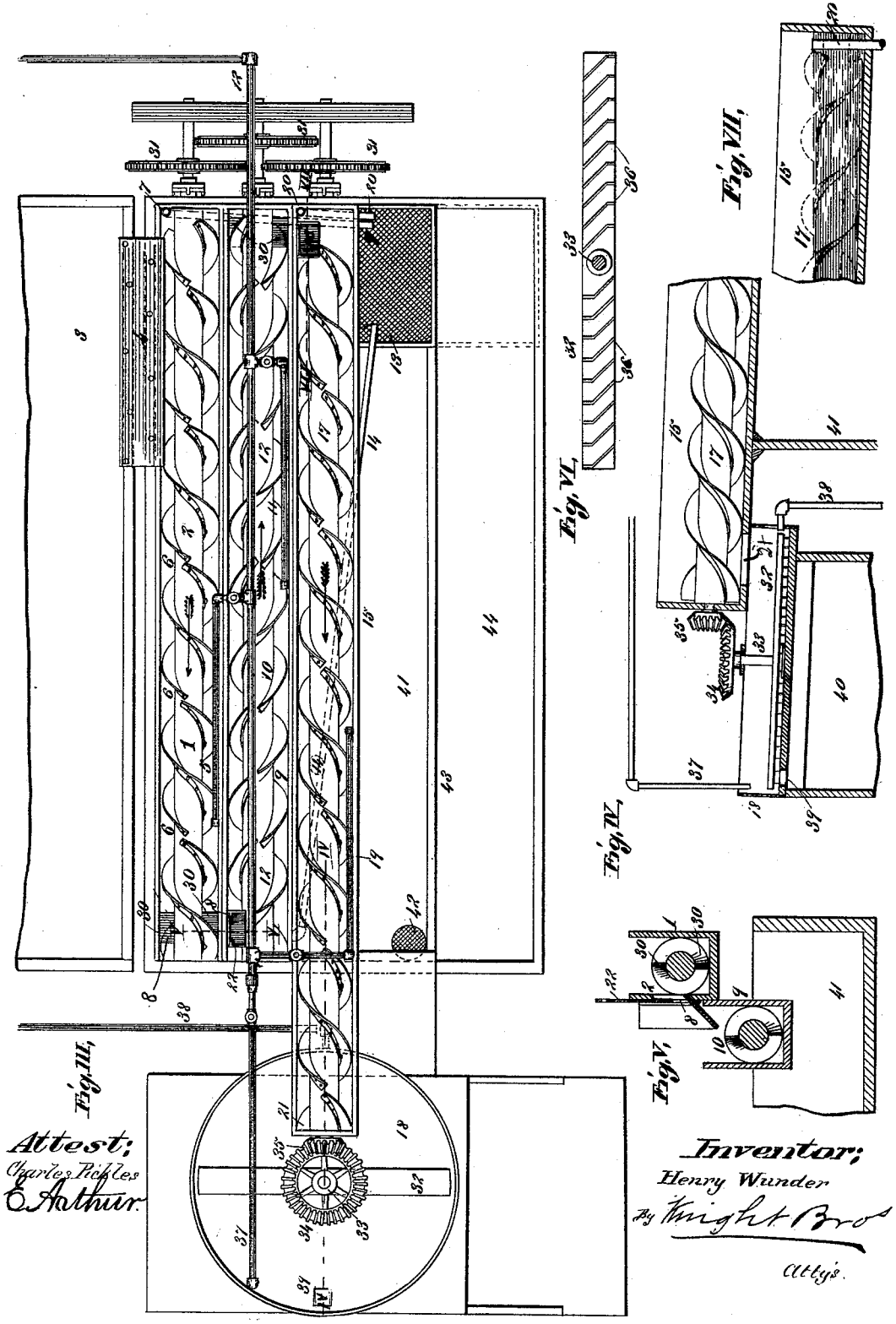
Attest:
Charles Pickles
E. Arthur
Inventor:
Henry Wunder
By Knight Bros
Atty's

_UNITED STATES PATENT OFFICE._

HENRY WUNDER, OF ST. LOUIS, MISSOURI, ASSIGNOR TO THE PAGE & KRAUSSE MANUFACTURING AND MINING COMPANY, OF SAME PLACE.

MACHINE FOR WASHING ORES.

SPECIFICATION forming part of Letters Patent No. 414,103, dated October 29, 1889.

Application filed April 1, 1889. Serial No. 305,552. (No model.)

*To all whom it may concern:*

Be it known that I, HENRY WUNDER, of the city of St. Louis, in the State of Missouri, have invented a certain new and useful Improvement in Machines for Washing Ores, of which the following is a full, clear, and exact description, reference being had to the accompanying drawings, forming part of this specification, and in which—

Figure I is an end view of my improved machine. Fig. II is a side elevation. Fig. III is a top view. Fig. IV is a detail vertical longitudinal section taken on line IV IV, Fig. III. Fig. V is a detail vertical transverse section taken on line V V, Fig. III. Fig. VI is a bottom view of the tub-conveyer; and Fig. VII is a section taken on line VII VII, Fig. III.

My invention relates to an improved machine for washing the dirt and foreign matter from ore, such as sulphate of barytes, &c.; and my invention consists in features of novelty hereinafter fully described, and pointed out in the claims.

Referring to the drawings, 1 represents an inclined trough, in which is located a screw conveyer 2. Into this trough the ore or substance to be cleaned is shoveled from a box 3 or other receptacles; or, of course, it might be discharged into the trough 1 by a suitable spout.

4, Fig. III, represents a plate of metal placed between the box 3 and trough 1 to catch any substance that may fall from the shovel as it is being transferred from the box to the trough.

The conveyer 2 is turned to move the ore in the direction indicated by the arrow in Fig. III, or to convey it from the lower to the upper end of the trough, which is inclined, as shown in Fig. II. As the ore is thus conveyed from the lower to the upper end of the trough it is being washed by water, which is discharged into the trough through a pipe 5. The conveyer causes the material to be turned over and over, thus presenting every portion of it to the action of the water, and to facilitate this I form the flights of the conveyer in sections, leaving them disconnected, as shown at 6, through which the water will pass as it moves from the upper to the lower end of the trough. At the lower end of the trough the water escapes through a pipe 7. On reaching the upper end of the trough the material passes through an opening 8 to a trough 9, inclined in the opposite direction to that of the trough 1, as shown in Fig. II. The trough 9 is also provided with a conveyer 10, the flights of which are formed in sections, like the conveyer 2, for the purpose stated, and the material is moved in this trough in the direction indicated by the arrow in Fig. III. The water for washing the ore is deposited into this trough through a branch 11. I have shown the pipes 5 and 11 as branches of the main pipe 12. However, they may be independent pipes, of course, if preferred. The pipe 7 of the trough 1 discharges into a screen-bottom box 13, and the water from the trough 9 is also discharged into this box through a pipe 14, and any particles of matter carried by the water from the troughs are collected in this box. When the stuff reaches the upper end of the trough 9 it is discharged again into a similar trough 15 through an opening 16. This trough 15 is inclined in the opposite direction from that 9, as shown in Fig. II, and it is provided with a conveyer 17, formed in the same manner as those previously mentioned, and which conveys the stuff in the direction indicated by the arrow, and deposits it into a pan or tub 18; or, if preferred, other troughs and conveyers might be provided, and the material thus passed through them before being deposited into the tub 18. I, however, find that three is about the proper number to wash the stuff well.

The water is deposited into the trough 15 through a branch 19 of the pipe 12, and leaves the trough through a pipe 20, Fig. VII, which discharges into the box 13. The upper end of the trough 15 is provided with an opening 21, through which the ore falls into the pan 18. The openings 8 and 16 are preferably provided with sliding valves 22, one of which is shown in Fig. V, and by which the passage of the material may be regulated. To facilitate the discharge of the material through these openings 8 and 16, the ends of the shafts 2 and 10 are provided with wings 30, which project at right angles to the conveyers and serve to lift the material as it reaches the ends of the troughs, and deposit it through the openings. The wings of the conveyer 2 are shown in Fig. V.

For the purpose of utilizing the water to the best advantage, a quantity of it is held in the troughs, and to accomplish this I extend the pipes 7, 14, and 20 up a distance into the troughs, as shown in Fig. VII. This keeps a quantity of the water in the troughs in which the ore is moved by the conveyers, and the troughs are prevented from overflowing by providing the pipes.

The conveyers are turned by any suitable means. I have shown them provided with pulleys or chain-wheels 31, with which belts from any suitable motor would connect.

In the tub 18 is a conveyer 32, secured to a vertical shaft 33, suitably mounted in the tub and provided with a bevel-wheel 34 on its upper end, into which meshes a pinion 35 on the end of the conveyer 17, and by this connection the conveyer 32 is operated through means of the screw-conveyer 17. The bottom of the conveyer 32 is formed with flights or ribs 36, which move the stuff around in the tub, where it is washed by water discharged into the tub through a pipe 37, and which leaves the tub through a pipe 38. The tub has an opening 39 at the side opposite the discharge-pipe 38. To this opening the material is carried by the conveyer 32 and discharged into a suitable receptacle 40. The tub is placed on an inclination, as shown in Figs. II and IV, so that the water runs from the opening 39 to the pipe 38, and does not run out of the tub at the opening.

The water and stuff running through the screen 13 pass into a box 41, placed beneath the troughs, and from this box it escapes through a pipe provided with a screen 42. (See Fig. III.) In the box 41 the fine ore carried by the water settles, and this box is provided with a partition 43, on the side 44 of which the stuff may be deposited from the main part of the box 41, and it may be screened as it passes from one trough to the other by shifting or sliding the sieve or screen 13 endwise to the position shown in dotted lines, Fig. III.

I claim as my invention—

1. In a machine for washing ores, &c., the combination of troughs provided with conveyers and inclined in opposite directions, and pipes for discharging the water into the troughs, substantially as and for the purpose set forth.

2. In a machine for washing ores, &c., the combination of the troughs inclined in opposite directions, conveyers located within the troughs, pipes for discharging water into said troughs, and discharge-pipes extending a distance into the troughs, whereby the water in the troughs is maintained at a given level and the ore kept constantly immersed, substantially as and for the purpose set forth.

3. In a machine for washing ores, &c., the combination of the oppositely-inclined troughs, conveyers located in the troughs, and pipes for discharging water into the troughs and conveying it therefrom, said troughs having direct communication with each other at opposite ends, whereby the ore is kept constantly on the ascent against the action of the water, substantially as and for the purpose set forth.

4. In a machine for washing ores, &c., the combination of the oppositely-inclined troughs having communication with each other, conveyers located within the troughs, pipes for discharging water into and conveying it from the troughs, and a sieve into which the pipes carrying the water from the troughs deliver, substantially as and for the purpose set forth.

HENRY WUNDER.

In presence of—
EDW. S. KNIGHT,
THOMAS KNIGHT.